United States Patent [19]

Kückens

[11] 4,121,507

[45] Oct. 24, 1978

[54] APPARATUS FOR MIXING A CARBONATED BEVERAGE

[75] Inventor: Alexander Kückens, Hamburg, Fed. Rep. of Germany

[73] Assignee: Dagma GmbH & Co. Deutsche Automaten-und Getränke Maschinen, Reinfeld, Fed. Rep. of Germany

[21] Appl. No.: 728,015

[22] Filed: Sep. 29, 1976

Related U.S. Application Data

[60] Division of Ser. No. 667,681, Mar. 17, 1976, abandoned, which is a continuation-in-part of Ser. No. 560,797, Mar. 21, 1975, Pat. No. 3,991,219, which is a continuation-in-part of Ser. No. 536,583, Dec. 26, 1974, abandoned.

[51] Int. Cl.² .................................... A23L 2/00

[52] U.S. Cl. .................................... 99/275; 222/129.1

[58] Field of Search .................... 99/275, 323.1, 323.2; 222/129.1, 129.4, 564; 426/330.3, 442, 477, 590

[56] References Cited

U.S. PATENT DOCUMENTS

| | | | |
|---|---|---|---|
| 1,878,795 | 9/1932 | Minsky et al. | 99/275 |
| 3,472,425 | 10/1969 | Booth et al. | 222/129.1 |
| 3,687,684 | 8/1972 | Wentworth et al. | 426/477 |
| 3,832,474 | 8/1974 | Karr | 99/275 X |

FOREIGN PATENT DOCUMENTS

| | | | |
|---|---|---|---|
| 42,341 | 1930 | Denmark | 99/323.2 |

*Primary Examiner*—Philip R. Coe
*Assistant Examiner*—Arthur O. Henderson
*Attorney, Agent, or Firm*—Michael J. Striker

[57] ABSTRACT

A plurality of different liquid flavoring agents is accommodated at static pressure in respective compartments having bottom dispensing valves, and the interior bottom region of each compartment is placed in communication with the atmosphere above the top of the compartment. A quantity of carbonated water is discharged into an open receptacle at a location spaced from the compartment, so that it travels at atmospheric pressure towards the valves associated with the respective compartments. When the discharged quantity of carbonated water reaches the valve associated with the compartment containing the selected liquid flavoring agent, the valve of the compartment in question opens and discharges a preselected amount of the liquid flavoring agent into the carbonated water with which the flavoring agent becomes mixed to form a finished beverage that can be dispensed.

6 Claims, 10 Drawing Figures

$CO_2$
Syrup
approx.3,5 bar approx. 0,96 bar
Syrup $CO_2$
$H_2O$
$H_2O + CO_2$
approx. 6 bar $CO_2$
$H_2O$
approx. 6 bar

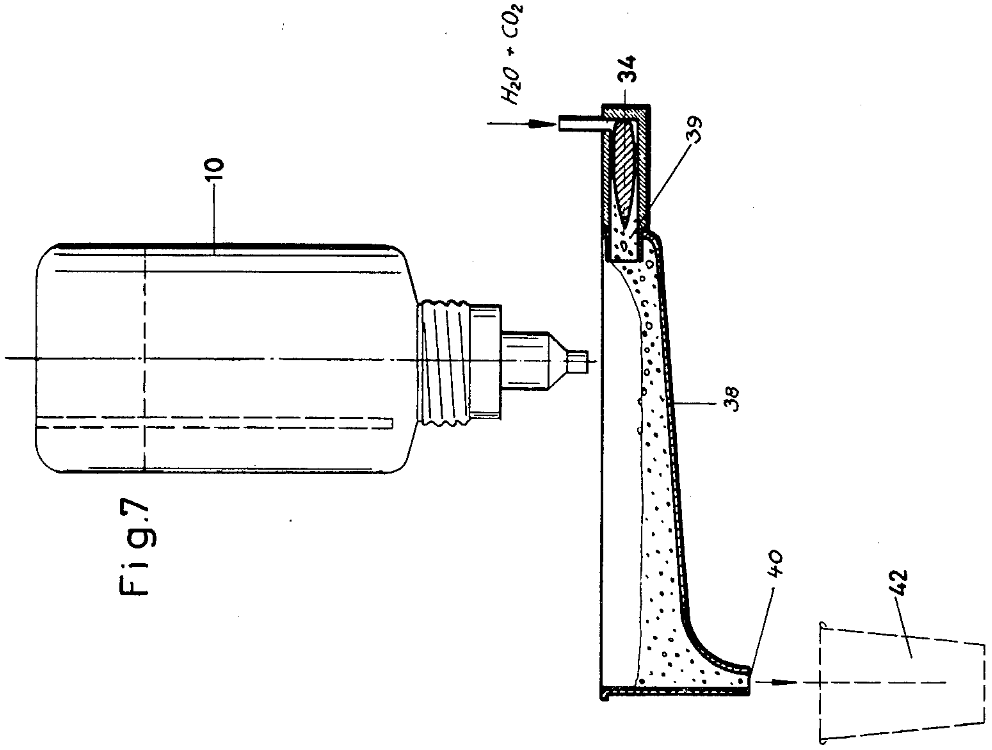
Fig.7
PRIOR ART
Fig.6
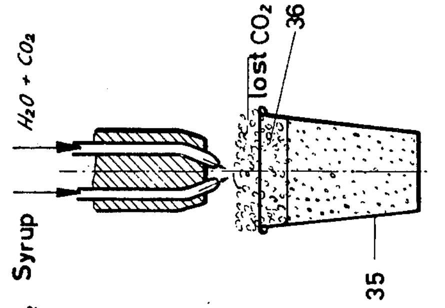
PRIOR ART
Fig.5
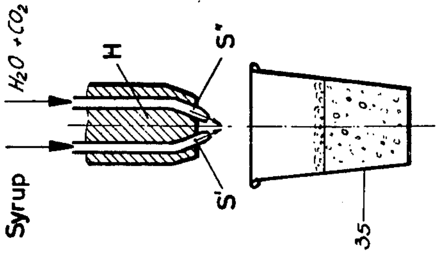

APPARATUS FOR MIXING A CARBONATED BEVERAGE

CROSS-REFEREMCE TO RELATED APPLICATIONS

This is a division of my copending application Ser. No. 667,681, filed on Mar. 17, 1976, and now abandoned, which was a continuation-in-part of my application Ser. No. 560,797, filed on Mar. 21, 1975, and now U.S. Pat. No. 3,991,219, in turn, was a continuation-in-part of my earlier application Ser. No. 536,583, filed on Dec. 26, 1974, now abandoned.

BACKGROUND OF THE INVENTION

The present invention relates generally to the mixing of carbonated beverages, and more particularly to an apparatus for effecting such mixing without pressure.

In the automatic production of carbonated beverages, for example cola-type beverages, orange drinks, lemonade drinks and the like, aromatic flavoring agents in liquid form, e.g., syrups and concentrates, are used which are supplied at certain pressures to a discharging valve which discharges a predetermined quantity of the respective flavoring agent into carbonated water. The carbonated water is transported in pressurized supply lines into a mixing head for example of a soft drink dispensing machine where it becomes mixed with the predetermined quantity of flavoring agent to form a finished beverage that may be dispensed.

Widespread as this approach is, it has certain disadvantages which make improvements in this field of art highly desirable.

In particular, the equipment which is required for accomplishing this conventional procedure is very complicated, necessitating the provision of many containers, pressure-withstanding conduits and the like. Moreover in order to obtain a readier mixing between the liquid flavoring agent and the carbonated water, the prior art can use only liquid flavoring agents with a limited viscosity and thus limited sugar content, that is flavoring agents the Brix number of which does not exceed a maximum of 56. Even under these circumstances it is observed that clogging of the pressure lines, valves and containers may occur due to formation of encrustations resulting from crystallization of sugar. Aside from the manner in which this interferes with the proper operation of the dispensing equipment, this relatively low Brix number has the disadvantage that the flavoring agents are not self-conserving, because up to 60 Brix the flavoring agents are not inherently sterile and must therefore be made sterile by applying heat or adding preservatives to them.

A further disadvantage of the prior art has to do with the carbonating of the water. The prior art systems have a certain $CO_2$ content in the cooled water. The carbonated water is supplied under pressure to the dispensing point in the immediate vicinity of which the liquid flavoring agent is added to the carbonated water. As soon as the carbonated water leaves the dispensing valve and is discharged into conditions of atmospheric pressure, turbulence results due to the expansion of the $CO_2$ which takes place, so that a part of the $CO_2$ content becomes lost. This loss is further increased in that the mixing between carbonated water and liquid flavoring agent takes place at a time and at a location at which the turbulence resulting from the expansion has not yet quieted. All of the prior-art devices operating on this principle, the so-called "post-mix devices", are possessed of this disadvantage and are incapable of imparting to the dispensed beverage as high a $CO_2$ level as is for instance present in a similar carbonated beverage contained in a bottle or can. Attempts to increase the $CO_2$ content in the dispensed beverage by increasing the amount of $CO_2$ admitted into the water to carbonate the same result in a formation of a foam head on the dispensed beverage, which is not acceptable and which, furthermore, again results in $CO_2$ losses.

SUMMARY OF THE INVENTION

Accordingly, the present invention aims to overcome the disadvantages of the prior art.

More particularly, it is an object of the present invention to provide an apparatus for mixing a carbonated beverage which overcomes the aforementioned disadvantages.

It is another object of the present invention to provide such an improved apparatus in which it is possible to obtain carbonation values for a dispenser-supplied beverage which are substantially equal to the carbonation values obtained in a carbonated beverage that is supplied in a can or bottle, and which in most instances are even better.

A particular object of the invention is to provide such an apparatus which operates completely without pressurization of any of the components of the dispensed beverage, that is wherein the mixing of the components is carried out without any kind of pressure and without turbulence.

A concomitant object of the present invention is to devise an apparatus for mixing such components in which the components are thoroughly mixed in the finished beverage.

In keeping with these objects, and with others which will become apparent hereafter, one feature of the invention resides in an apparatus for mixing a carbonated beverage which comprises means for confining at least one liquid flavoring agent at static pressure in a compartment having a bottom dispensing valve, and means for placing the interior bottom region of the compartment in communication with the atmosphere above the top of the compartment. A quantity of carbonated water is then admitted into an open receptacle for travel towards the valve, and the valve is opened when the travelling carbonated water has arrived at the same, to dispense a predetermined amount of flavoring agent at an elevated temperature into the flowing water for mixing with the same to form a beverage so that a part of the $CO_2$ content of the carbonated water is rapidly released in form of bubbles which enhance the mixing of the flavoring agent with the carbonated water. The beverage is then dispensed for consumption.

The present invention makes it possible to add juices, syrups and concentrates, including for example alcohol-containing agents, to carbonated water without requiring any pressure at all for the mixing. The carbonated water travels in an open conduit e.g. a trough which is open to the ambient atmosphere, and it becomes mixed with the dispensed quantity of flavoring agent to form a finished carbonated beverage having the desired $CO_2$ content. An absolutely homogeneous mixing of the water and the flavoring agent is assured under all circumstances, even if the syrup or concentrate has so much sugar content that it is self-conserving, that is if it has a Brix number of between substantially 60 and 70.

To obtain the best results, I employ a so-called fine-impregnation of the water with $Co_2$, that is the $CO_2$ bubbles are so small in diameter that during the mixing process they have only a relatively small buoyancy with the result that the $CO_2$ tends to escape in the usual sense only at the time at which the finished beverage has already been dispensed into a drinking receptacle, and its temperature begins slightly to increase. Premature losses of $CO_2$ are thereby avoided.

The invention overcomes a worldwide and long-standing problem which holds that if the carbonated water is mixed with the syrup or concentrate at atmospheric pressure, all or most of the $CO_2$ will have escaped by the time the finished beverage can be dispensed, and that in any case proper mixing at atmospheric pressure is not possible in this type of equipment.

When water or any other liquid is carbonated, the carbon dioxide gas will form either large or small bubbles, sometimes both. If the bubbles are predominantly large, the liquid is said to be "course impregnated" because of the "course" (i.e. large) bubbles. Conversely, a liquid charged with small $CO_2$ bubbles is said to be "fine impregnated". Large bubbles can be obtained without trouble; small bubbles are difficult to produce and it is in practice impossible to charge a liquid with fine bubbles without at the same time also obtaining a certain proportion of course bubbles.

Moreover, the ratio of fine bubbles to course bubbles changes drastically during handling of the charged liquid, i.e. during transportation and dispension, as a result of turbulence. For example, when one shakes a can of beer or soda, the liquid in the same is agitated during the shaking. Fine $CO_2$ bubbles impact one another as a result of the turbulence resulting from the agitation, and merge to form larger bubbles. Since these have substantially greater buoyancy than the smaller bubbles, they escape from the liquid immediately upon opening the can, producing the familiar foaming which everyone has experienced when opening a can or bottle of carbonated beverage that was agitated. This amount of $CO_2$ is therefore immediately lost from the beverage.

Conditions analogous to the aforementioned agitation obtain in the prior-art dispensing devices for carbonated beverages. The liquids to be mixed, e.g. syrup and carbonated water, are fed in pressurized conduits to the dispension point. Due to its flow turbulence, the carbonated water at this time already includes a substantial proportion of large $CO_2$ bubbles. During mixing of the liquids, turbulence is deliberately encouraged in order to obtain a homogeneous admixture of the liquids before dispensing. The beverage is admitted into the drinking container, e.g. a paper cup, in this turbulent stage. Considering the earlier example of an agitated can, it is not surprising that by the time of entry into the cup the beverage contains so large a proportion of large $CO_2$ bubbles — which immediately escape under the formation of foam — that its remaining $CO_2$ content is rather low by the time it reaches the consumer.

As mentioned earlier, the foam formation can be reduced by adding less $CO_2$ to the water. This is evidently self-defeating since the finished beverage will then have a still lower level of carbonation.

Another disadvantage of the prior art is the fact that the flavoring agent, e.g. the syrup or concentrate, especially cola syrup, itself usually contains a certain gaseous component which further contributes to the foam formation. This problem has been overcome in the prior art by using special measures intended to remove the gaseous component, e.g. by subjecting the syrup, after manufacture but before packing, to the influence of vacuum. However, it is evident that this involves additional operations and increases the manufacturing expense.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 5 and 6 are two diagrammatic vertical sections, showing how carbonated water and flavoring agent are dispensed and mixed with one another in the prior art;

FIG. 7 is a diagrammatic vertical section showing those parts of a dispensing apparatus according to the present invention, which are necessary for an understanding of the invention;

DESCRIPTION OF THE PREFERRED EMBODIMENTS

Figures 1, 2, 3, 4:
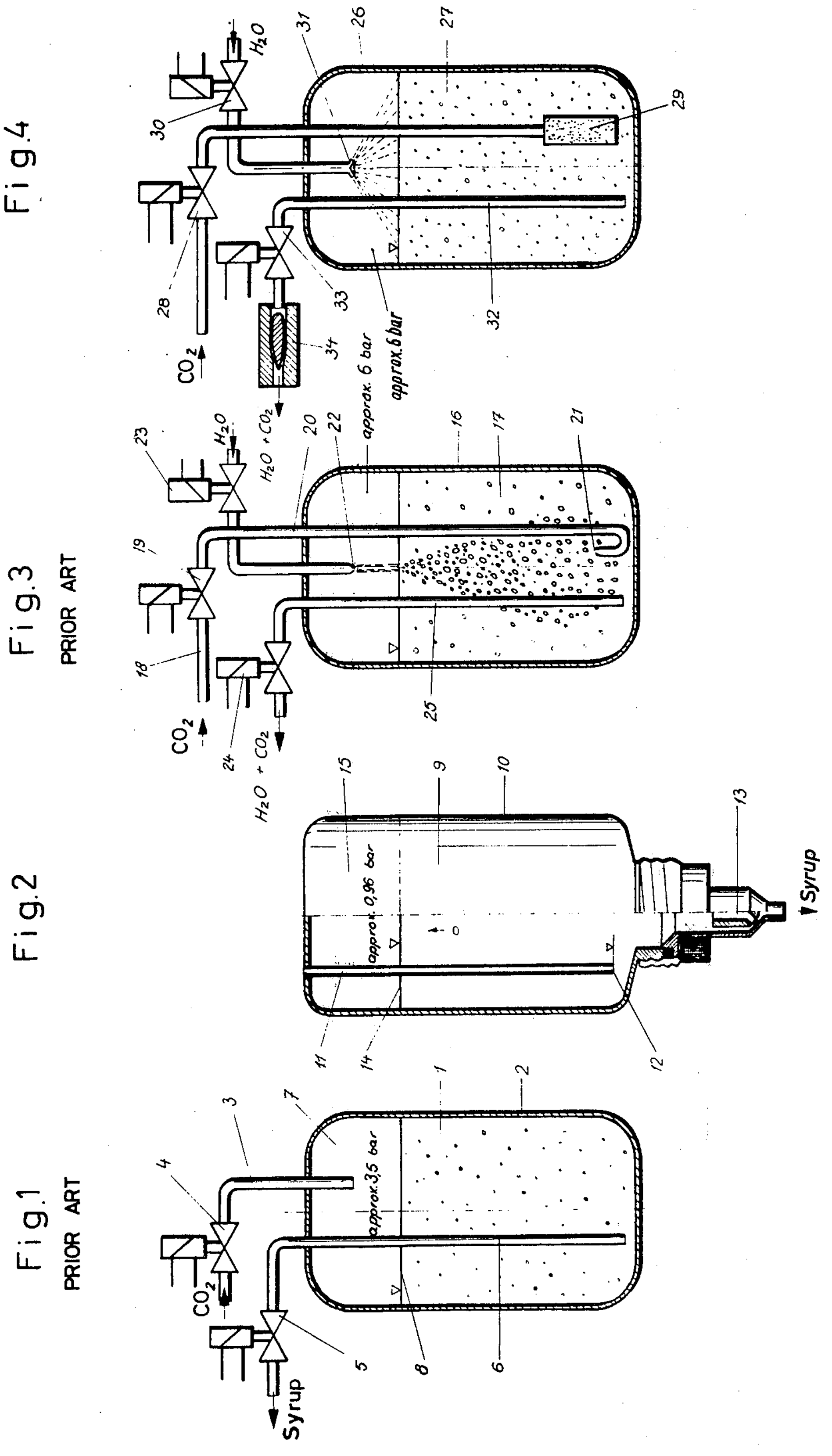
Fig.1 PRIOR ART
Fig.3 PRIOR ART
FIG. 1 is a diagrammatical vertical section, illustrating how flavoring agent is dispensed in the prior art.
FIG. 2 is a view similar to FIG. 1, but showing how the flavoring agent is dispensed according to the present invention.
FIG. 3 is a diagrammatic vertical section, illustrating how water is carbonated in dispensers of the prior art.
FIG. 4 is a view similar to FIG. 3, but showing how the water is carbonated in accordance with the present invention.

No attempt has been made in the drawing to illustrate details which are already well known to those skilled in the art. The drawing does, however, juxtapose the prior art techniques with the present invention in several Figures.

FIGS. 1 and 2 are concerned with the dispensing of flavoring agents, e.g. liquid concentrates or syrups. As FIG. 1 shows, the prior art does this under pressure. For this purpose, a liquid flavoring agent 1 is stored in a container 2. The space 7 above the liquid level 8 communicates with a conduit 3 through which $CO_2$ under pressure is admitted via a valve 4. An outlet conduit 6 has its lower end located in the liquid 1, adjacent the bottom of the container 2. When the valve 5 of the conduit 6 is open, the pressure of the $CO_2$ will force the liquid 1 out of the container 2 in a turbulent flow. This turbulence will be further increased by any residual gaseous components that may still be present in the liquid 1 from its manufacture, unless they have been previously removed during a separate manufacturing step. In any case, however, the turbulence of the discharged liquid, when the latter mixes with carbonated water, will cause a loss of $CO_2$.

By contrast, the present invention uses a flavoring agent dispensing principle that was first disclosed in my prior U.S. Pat. No. 3,258,166. As shown in FIG. 2, a container 10 is arranged with its outlet facing downwardly. A vent tube 11 extends through a liquid flavoring agent 9 to the region of the downwardly directed endwall of the container 10; its upper end communicates with the ambient atmosphere outside the container 10, preferably above the same. Therefore, the static pressure level for the liquid 9 being discharged through an electromagnetic valve 13 is located at 12. Where the prior art has elevated pressure in the space 7 above the liquid 1, the present invention has underpressure in a space 15 above the level 14 of liquid 9; because of this, any gases contained in the liquid 9 can rise into the space 15 and cannot cause turbulence and $CO_2$ loss when the liquid 9 becomes mixed with carbonated water. Also, a separate processing step for degasification of the liquid 9 is thereby rendered unnecessary.

A further aspect of the invention is compared with the prior art in FIGS. 3 and 4. FIG. 3 shows a prior art device for charging, i.e. carbonating, a liquid such as water. A container 16 accommodates a body of carbonated liquid 17. A conduit 20 extends into the body of liquid 17 and has its outlet nozzle 21 located near the container bottom. The conduit 20 communicates with a $CO_2$ supply conduit 18 via a valve 19. An outlet conduit 25 for carbonated liquid 17, e.g. water, is controlled by a valve 24 and has its inlet located near the container bottom. Fresh water which is to replace the quantities of water which have been withdrawn via conduit 25, is admitted via a conduit 22 and a valve 23. This water is admitted under pressure in form of a stream which creates turbulence in the body of liquid 17 and causes smaller bubbles to unite into larger bubbles which, when water is dispensed via conduit 15, rapidly escape and cause the formation of foam.

The manner in which the liquid is charged with $CO_2$ according to the invention is shown in FIG. 4, wherein a container 26 accommodates a body 27 of carbonated water. A conduit, controlled by a valve 28, admits $CO_2$ into the body of water 27, but not through a nozzle as in FIG. 3. Instead, the $CO_2$ is forced to pass through a member 29 of a material having fine pores, e.g. a ceramic body. The $CO_2$ therefore can form only small bubbles in the body of water 27. Turbulence is avoided, since the incoming replacement water is admitted via a valve 30 and a misting nozzle 31, so that it becomes atomized and settles gently onto the surface of the body of water 27, instead of penetrating the water in form of a turbulence-producing stream. The charged body of water 27 is withdrawn through a conduit 32 and via an expansion nozzle having a generally tear-drop shaped member 34.

Having described how the prior art supplies its carbonated water and the flavoring agent, it is now time to consider how these liquids are dispensed in the prior art. This is shown in FIGS. 5 and 6.

The two liquids to be mixed, i.e. the carbonated water and the flavoring agent (e.g. syrup) are discharged from outlet passages S' and S'' of a dispensing head H in form of streams or sprays. Both liquids are under pressure and the two passages are so oriented that the streams of liquid discharged from them will impinge and mix with one another. The intension in constructing the dispensing head H in this manner is to obtain intimate mixing, but the actual disadvantageous result is the development of a stream having such a pronounced turbulence that a large number of large $CO_2$ bubbles forms which promptly escape from the stream. This formation of the large bubbles and of the attendant form head is graphically shown in the partially filled cup 35 in FIG. 5; in FIG. 6 it will be seen that by the time the cup 35 is completely filled, so many of the large bubbles will have escaped from the beverage that they will form a substantial "head" of foam on top of the beverage in the cup. All of the $CO_2$ which have gone into forming the foam head is, of course, lost from the beverage. Substantial amounts of $CO_2$ have escaped into the atmosphere by this time and thus have been lost. The end result is that a beverage dispensed in this manner in accordance with the teaching of the prior art will have considerably less of a remaining $CO_2$ content than the same beverage would have if it were supplied in a bottle or can instead of from a dispensing machine.

Figure 9:
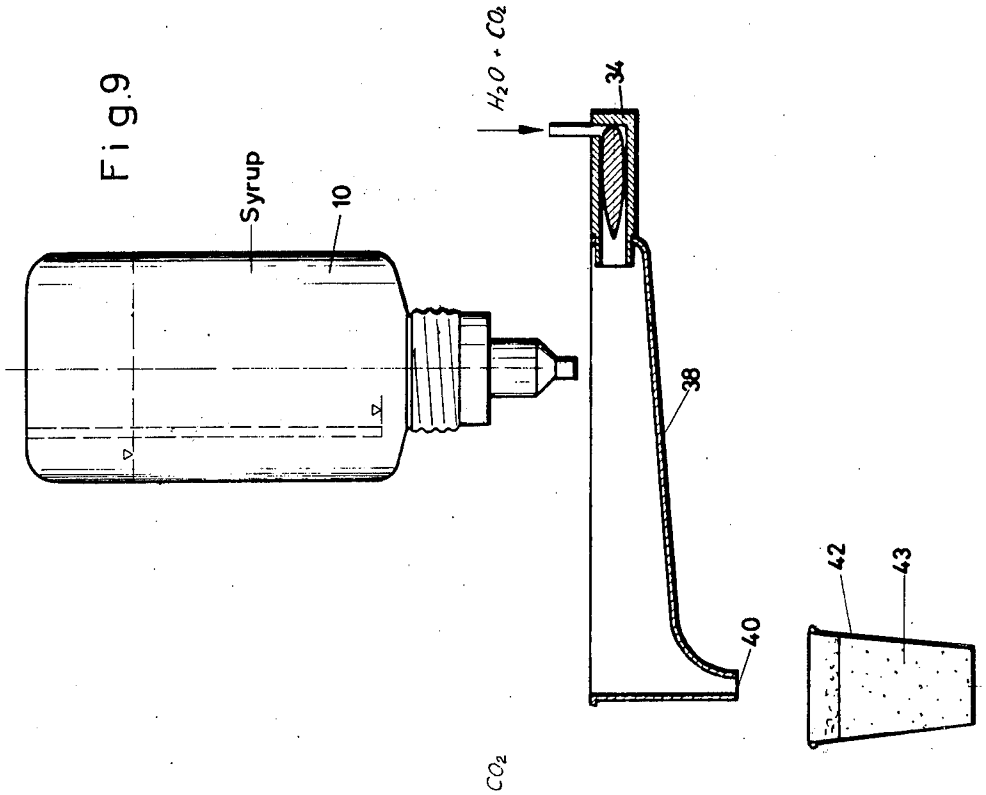
FIG. 9 shows the apparatus of FIGS. 7 and 8 upon completion of the dispensing operation.
Figure 8:
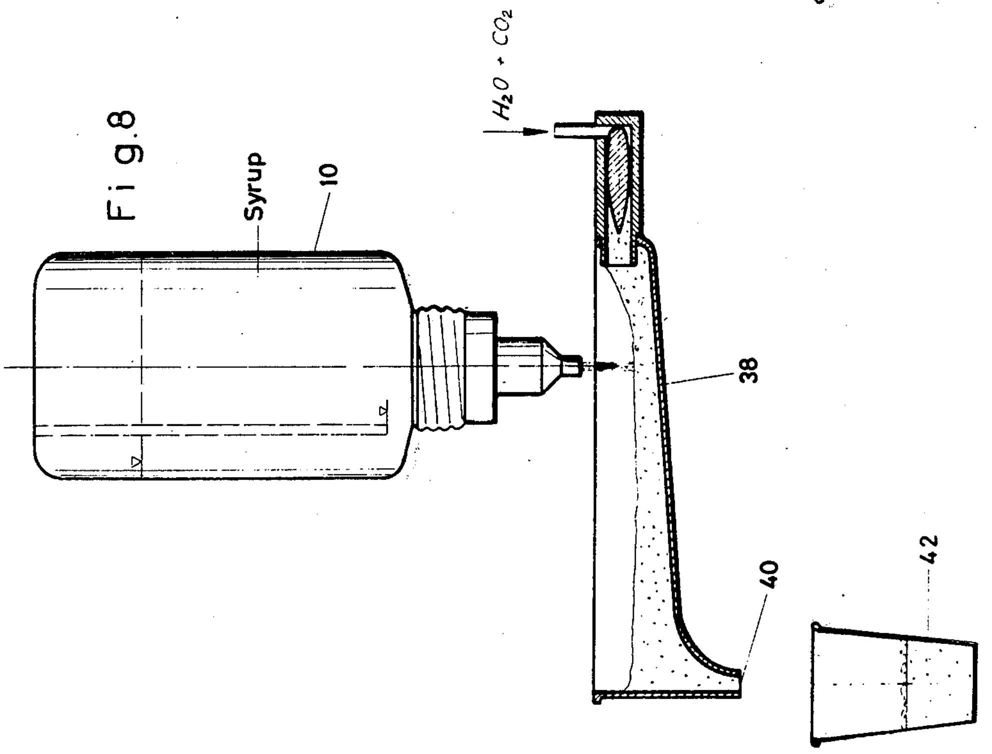
FIG. 8 shows the apparatus of FIG. 7 during the discharge of flavoring agent into carbonated water.

By contrast to FIGS. 5 and 6, the manner in which the beverage is dispensed according to the present invention is shown in FIGS. 7 - 9.

In these FIGS. 7 - 9, reference numeral 38 identifies a conduit (e.g. a trough) which is open to the atmosphere. In the region of one end it has the expansion nozzle 34 through which it receives carbonated water from the container 26 (see FIG. 4); in the region of its other end it is provided with a beverage-dispensing outlet 40. The nozzle 34 and the outlet 40 could, of course, also be otherwise positioned. Arranged above the trough 38 is a container 10 (see FIG. 2) for dispensing a flavoring agent.

It should be appreciated that even the special measures taken by the present invention in the handling of the flavoring agent and the carbonated water cannot entirely preclude the formation or presence of some of the large $CO_2$ bubbles in the water. As will be clear from the preceding description, such large $CO_2$ bubbles will cause turbulence when the beverage enters the cup 42 or other utensil (compare the description of FIGS. 5 and 6). Clearly, each large $CO_2$ bubble, which rises rapidly to the surface of the beverage in the cup 35, will carry along with it one or more of the small bubbles and cause a net loss of $CO_2$.

Such residual large $CO_2$ bubbles as are present in the carbonated water 39 despite the precautions taken with reference to the contents of the containers 10 and 26, are eliminated in the trough 38. The height of the stream of water 39 flowing in the trough 38 is relatively small; therefore, the highly buoyant large $CO_2$ bubbles rise to the surface substantially immediately after the water issues from the expansion nozzle 34, and escape into the atmosphere, leaving behind water which contains almost exclusively small $CO_2$ bubbles which, due to their much lower buoyancy, will not so escape.

The loss of the large $CO_2$ bubbles is not quite complete by the time the water issuing from expansion nozzle 34 reaches the outlet of the container 10. The electromagnetic valve of the latter is now energized (see FIG. 13 and U.S. Pat. No. 3,258,166) to discharge a predetermined amount of liquid flavoring agent into the stream of flowing water 39. Residual large $CO_2$ bubbles, which continue to escape during further travel from the container 10 to the outlet 40, aid in mixing of the flavoring agent with the carbonated water, so that a substantially homogeneous mixture is obtained by the time the beverage reaches the outlet 40.

The flavoring agent, because of its high Brix number and thus the self-conserving properties thereof, can be maintained at the ambient temperature which may be as high as 20° or 30° C. On the other hand, the carbonated water 39 is dispensed by the nozzle 34 at a temperature of approximately 1° C. Thus, when the flavoring agent is mixed with the carbonated water 39, the temperature of the latter rises sufficiently for a part of the $CO_2$ contents to become released in form of relatively large bubbles which again rise to the surface of the water 39 during its travel from the container 10 to the outlet 40, such additional bubbles further enhancing the mixing of the flavoring agent with the carbonated water 39. While a small additional amount of $CO_2$ is loss in this way, it is a small price to pay for improved homogenization of the beverage. Only a very slight head will develop in the cup 42, primarily due to the impingement of the beverage upon the walls of the cup, despite the development of the additional large bubbles downstream of the container 10.

The termination of the dispensing cycle is shown in FIG. 9, where the trough 38 is empty and all of the beverage 43 is in the cup 42, ready for drinking. Tests have shown that the thus dispensed beverage contains more $CO_2$ than similar bottled or canned beverages even when the flavoring agent is maintained at an elevated temperature.

Moreover, due to the fine-impregnation with small $CO_2$ bubbles, this beverage can — after dispensing — be allowed to sit in the open for a much longer time than previously possible, without losing its carbonation, since the small $CO_2$ bubbles do not have a very pronounced tendency to rise to the surface of, and escape from the beverage. The fact that no pronounced head forms during dispensing means that the total amount of beverage required to fill the cup or glass can be dispensed very rapidly.

The flavoring agent of the high Brix number discussed above has a substantial viscosity and thus does not readily mix with the carbonated water 39 which is at a temperature close to the freezing point so that layers of different flavoring agent concentrations would develop in the beverage being dispensed were it not for the homogenization of the beverage due to the action of the large bubbles escaping from the beverage downstream of the container 10, prior to discharge through the outlet 40.

It is also contemplated, according to a further concept of the invention, to heat at least the dispensed amount of the flavoring agent prior to its admission into the stream of the carbonated water 39, in a known manner which needs no detailed discussion, particularly when the ambient air is relatively cold or when it is desired to increase the temperature of the dispensed flavoring agent to above the ambient temperature to further the development of the homogenizing bubbles downstream of the container 10.

Figure 10:
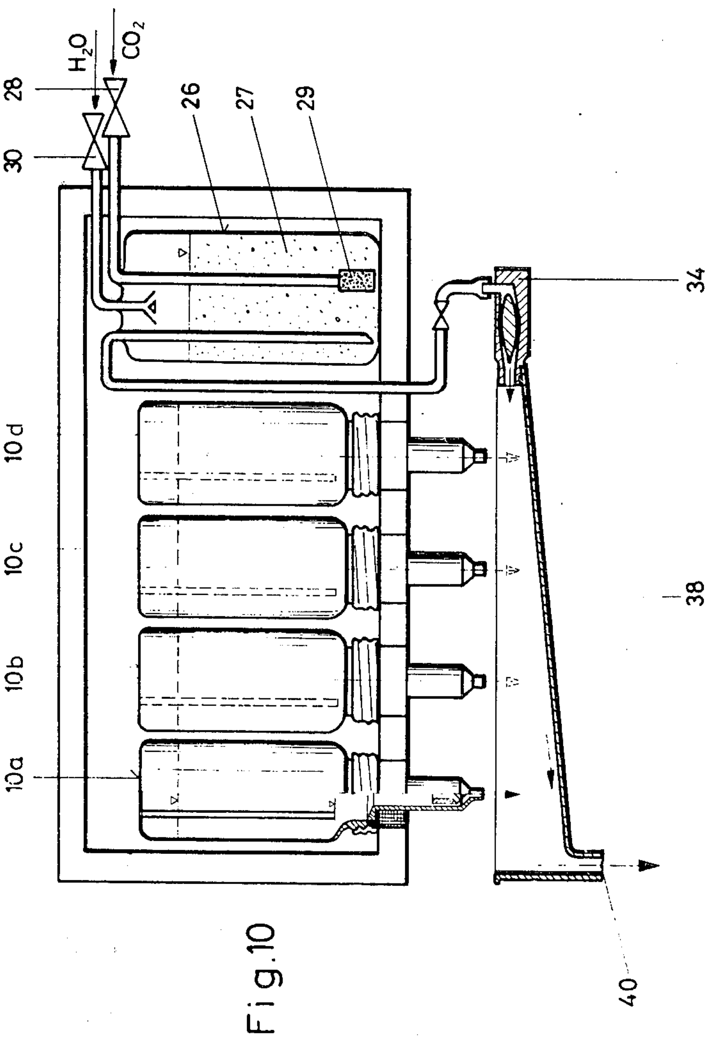
FIG. 10 shows an apparatus of the present invention which is capable of selectively dispensing a plurality of flavoring agents.

The embodiment of FIG. 10 corresponds in all essential details to that of FIGS. 7 - 9, and like reference numerals identify like components. The difference is in the provision of a plurality of containers **10*a*–10*d* of which each contains a different flavoring agent. For example, container 10*a* may contain cola syrup, container 10*b* orange syrup, container 10*c* cherry syrup, and so on. A timer (not shown, but see U.S. Pat. No. 3,258,166) must of course be so set that, depending upon which of the flavoring agents is selected by a user (e.g. with the usual pushbutton control, not shown), the electromagnetic dispensing valve of the proper container 10*a*, 10*b*, 10*c*, or 10*d*** will be operated at the time the dispensed carbonated water reaches the location beneath the container in question.

Evidently, there could be more or fewer than four containers for flavoring agents. It is also clear that the carbonated water in the container 26, and possibly also the flavoring agents in the containers **10*a*–10*d***, may be cooled. In fact, in view of public preference for cooled beverage, the carbonated water usually will be cooled; details of the cooling equipment required are known to those skilled in the art. The flavoring agents, e.g. syrups may also be cooled so as to maintain them at the proper viscosity which is desired for best dispensing. On the other hand, at least the dispensed amount of the flavoring agent may be at an elevated temperature so as to improve the homogenization of the beverage as previously discussed.

Tests have shown that the present invention makes it possible to dispense a carbonated beverage which has a higher $CO_2$ content than identical canned or bottled carbonated beverages, while requiring substantially less complicated equipment. Furthermore, due to the possibility of using self-conserving flavoring agents (i.e., flavoring agents having a high Brix number), the packing of the flavoring agents for storage and transport is less expensive. The need for complicated pressurizing and evacuating equipment, such as pumps and the like, which exists in the prior art because of pressurized dispensed of the components to be mixed, is eliminated.

While the invention has been illustrated and described as embodied in the dispensing of beverages, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features, that from the standpoint of prior art, fairly constitute essential characteristics of the generic or specific aspects of this invention.

What is claimed as new and desired to be protected by Letters Patent is set forth in the appended claims:

1. In a carbonated beverage dispensing apparatus, a combination comprising means for carbonating a body of water; means for conducting a stream of the carbonated water having large and small bubbles therein at atmospheric pressure and in streamlined flow, including a receptacle open to the ambient atmosphere and having an inlet and an outlet which are spaced from each other by a distance that is sufficient to permit the large bubbles to escape from the stream between said inlet and said outlet, and means for admitting the carbonated water from the body at atmospheric pressure into said receptacle through said inlet thereof to form said stream in said receptacle; means for confining a liquid flavoring agent, including a container; and means for discharging the flavoring agent at atmosphereic pressure into the stream, including a bottom dispensing valve of said container and means for maintaining the pressure within said container at such a value that the flavoring agent is substantially at atmospheric pressure in the region of said bottom dispensing valve, said bottom dispensing valve being arranged at a location of said receptacle which is spaced downstream from said inlet by a distance sufficient for the large bubbles to substantially escape intermediate said inlet and said location while the flavoring agent is mixed with the carbonated water with the aid of residual escaping large bubbles whereby a homogeneous mixture of the flavoring agent with the carbonated water is obtained downstream of said location and is dispensed from said receptacle through said outlet thereof in the form of a mixed carbonated beverage suited for consumption.

2. A combination as defined in claim 1, wherein said carbonating means comprises a vessel for a body of water, a conduit communicating with a source of $CO_2$ and having an outlet below the water level in said vessel, and a porous element closing said outlet so that the $CO_2$ is constrained to pass through the pores of said element and enter in form of micro-bubbles into said body of water.

3. A combination as defined in claim 2, wherein said carbonating means further comprises a discharge conduit for discharging quantities of carbonated water, and a replenishing conduit communicating with a source of water for replenishing the discharged quantities.

4. A combination as defined in claim 3, wherein said replenishing conduit has outlet nozzle means arranged above said water level and operative for spraying a mist of water onto said water level so as to avoid turbulence in the body of water.

5. A combination as defined in claim 1, wherein said bottom dispensing valve admits said predetermined amount into the carbonated water at an elevated temperature exceeding that of the latter, whereby a part of the $CO_2$ content of the carbonated water is rapidly released in form of large bubbles which enhance the mixing of the flavoring agent with the carbonated water.

6. A combination as defined in claim 5; and further comprising means for heating at least said predetermined amount to said elevated temperature prior to admission of said predetermined amount into the carbonated water.

* * * * *